June 10, 1941.                B. DICK                2,244,829
BRAKE CONTROL AIR VALVE
Filed April 20, 1939
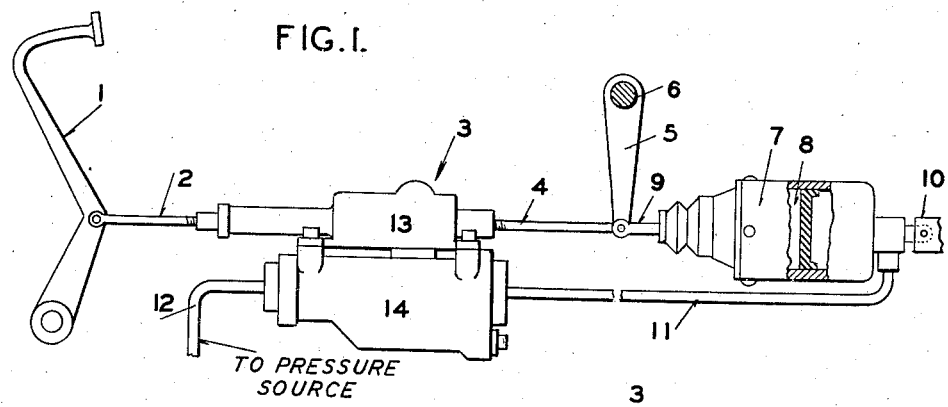
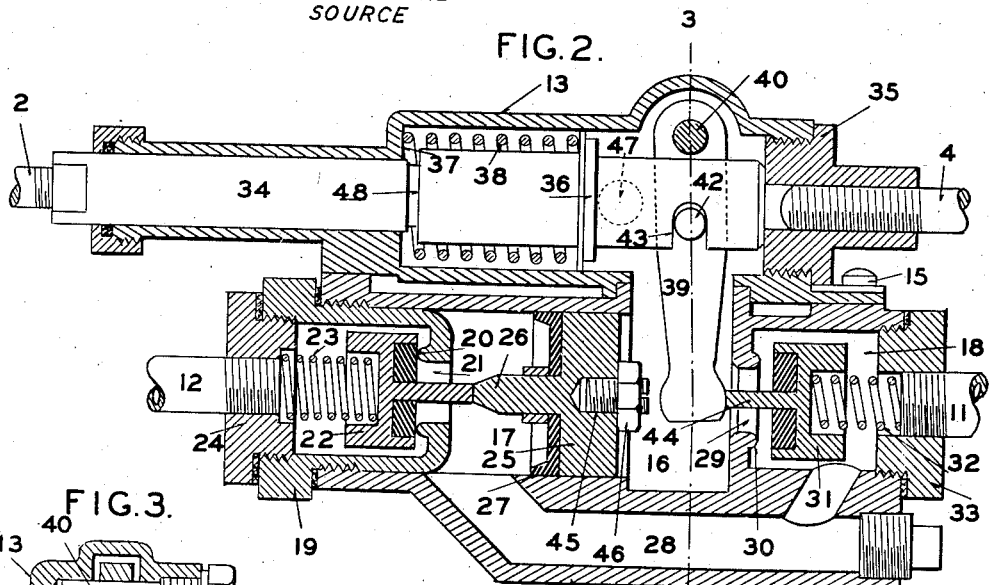
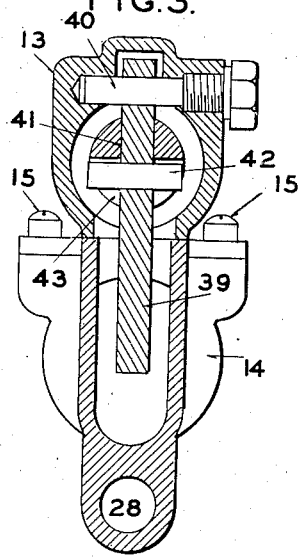
INVENTOR
BURNS DICK
BY
ATTORNEY Patented June 10, 1941

2,244,829

UNITED STATES PATENT OFFICE 2,244,829

BRAKE CONTROL AIR VALVE

Burns Dick, Ferguson, Mo., assignor to Wagner Electric Corporation, St. Louis, Mo., a corporation of Delaware Application April 20, 1939, Serial No. 268,935

7 Claims. (Cl. 121—41)

My invention relates to valves and more particularly to a valve for use in controlling fluid pressure in a fluid pressure actuated system.

One of the objects of my invention is to provide an improved follow-up valve construction for interposition in a mechanical force transmitting connection between a manually-operated member and a member to be actuated and which is operated as a result of lost motion to thereby control a fluid pressure operated motor also connected to the member to be actuated.

Another and more specific object of my invention is to provide means in said valve mechanism for causing a proper reaction or "feel" on the operator's foot when the valve is operated to control the fluid pressure system.

Other objects of my invention will become apparent from the following description taken in connection with the accompanying drawing in which Figure 1 is a view of a brake actuating system having embodied therein my novel control valve mechanism; Figure 2 is a longitudinal cross-sectional view through the valve mechanism; and Figure 3 is a cross-sectional view taken on the line 3—3 of Figure 2.

Referring to the drawing in detail, numeral 1 indicates a brake pedal which is connected by a rod 2 with my novel control valve mechanism generally indicated at 3, whereby this valve mechanism may be actuated. The casing of the control valve mechanism is secured to a rod 4 connected to an arm 5 on a cross shaft 6 which can operate any desired mechanism, as for example, the brakes of a vehicle. Also associated with arm 5 is a power cylinder 7, the piston 8 of which is connected to the arm by a rod 9 and the cylinder to a suitable support 10. Conduits 11 and 12 connect the power cylinder through the valve mechanism with a suitable pressure source, as for example, a pressure tank. The valve mechanism so controls the fluid pressure as to cause shaft 6 to be actuated by the power cylinder.

Referring to Figures 2 and 3, the casing of the valve mechanism comprises two sections 13 and 14 secured together by screws 15. The lower section 14 is provided with a central chamber 16, a forward cylindrical chamber 17, and a rear chamber 18. A cup-shaped member 19 is threaded into the cylinder 17 and carries a valve seat 20 surrounding the inlet opening 21. This valve seat has cooperating therewith an inlet valve 22 normally biased against the seat by a spring 23 interposed between said valve and a plug 24 which has threaded therein the conduit 12 leading from the source of pressure.

The cylinder 17 at the end adjacent the central chamber 16 has mounted therein a piston 25 provided with a forwardly extending projection 26 for cooperation with a projection on the inlet valve 22. A cup 27 seals the piston and prevents any passage of fluid from the cylinder 17 to chamber 16. The cylinder 17 at a point between the inlet 21 and piston 25 communicates with the rear chamber 18. This rear chamber is in communication with the central chamber 16 by an exhaust passage 29 and associated with this passage is a valve seat 30 with which cooperates an exhaust valve 31 biased toward the seat by means of a spring 32 interposed between the valve and a plug 33 to which is connected the conduit 11 leading to the power cylinder.

The upper casing section 13 has slidably mounted therein a rod 34 which is threadedly connected to rod 2 connected to the brake pedal. The rearward end of casing 13 has threaded therein a plug 35 to provide a connection for rod 4 leading to arm 5 on shaft 6. The rod 34 is provided with a shoulder 36 and interposed between this shoulder and a shoulder 37 on the casing is a spring 38 for normally biasing the rod 34 to the right and into abutting engagement with the plug 35. A lever 39 is pivoted to the casing above rod 34 by means of a pin 40 and extends through a slot 41 in the rod and into the central chamber 16 in the lower casing 14. The lever carries a pin 42 for cooperation with a cross slot 43 in rod 34 whereby the rod may actuate the lever. The lower end of the lever is adapted to cooperate with piston 25 in cylinder 17 and also with exhaust valve 31, which valve is provided with a suitable stem 44 extending through passage 29.

When rod 34 is biased to its normal position as shown in Figure 2, lever 39 will be in a position to hold the exhaust valve 31 unseated. When rod 34 is moved forward, lever 39 will permit the exhaust valve 31 to become seated and will then engage and move piston 25 to the left and since stem 26 of this piston is adapted to engage the inlet valve 22, this valve will be opened by movement of the piston. In order to properly adjust the clearance between piston 25 and the lower end of lever 39, the piston is provided with a screw 45 which is held in adjusted position by a lock-nut 46.

Since fluid is exhausted into chamber 16 through the exhaust passage 29, the portion of casing 13 above this chamber is provided with an opening 47 to the atmosphere to permit exhaust of fluid from the chamber. The rod 34 is also formed with a shoulder 48 for engagement with the shoulder 37 on the casing 13 whereby rod 34 can transmit force directly to the valve casing and rod 4 after a predetermined relative movement has taken place between rod 34 and the casing, this predetermined movement being such as to permit lever 39 to be actuated to such an extent that the exhaust valve 31 can close and the inlet valve 22 can be opened.

Referring to the operation of the structure just described, the parts of the valve mechanism will be in the position shown in Figure 2 when pedal 1 is released. When it is desired to operate the cross shaft 6, the pedal is depressed, thus moving rod 2, the valve casing and also rod 4 and arm 5 until such a resistance is encountered that spring 38 will be compressed. When this occurs, there will be relative movement between rod 34 and the casing section 13. This will result in lever 39 being rotated in a clockwise direction about its pivot 40. Rotation of the lever will cause its lower end to move away from stem 44 of the exhaust valve element and permit the element to become seated. At the time that the exhaust valve becomes seated, a slight clearance will exist between the lower end of lever 39 and the adjustable screw 45 which in practice is approximately two one-hundredths of an inch. Continued movement of rod 34 relative to casing 13 will cause lever 39 to move piston 25, thereby unseating the inlet valve element. Fluid under pressure from the source of pressure will now be admitted into cylinder 17 and since this cylinder is in connection with the power cylinder by means of passage 28, chamber 18 and conduit 11, fluid pressure will be effective upon the power cylinder piston to move this piston to the left and thus rotate arm 5 and operate the cross shaft 6. The fluid under pressure in chamber 17 is also effective upon piston 25 and tends to cause this piston to move to the right. This results in a reactive force on the lower end of lever 39, which force will be transmitted through the lever to rod 34 and the pedal, thus producing a reaction upon the operator's foot whereby he may "feel" the amount of fluid pressure which is effective in the power cylinder. The greater the pressure admitted to cylinder 17 through the inlet valve, the greater will be the reactive force transmitted to the operator's foot. Thus the operator will be informed of the amount of pressure which is being applied to arm 5 and the cross shaft.

When the movement of pedal 1 is discontinued at any point in its path of travel, the follow-up movement of the valve casing, due to its connection with arm 5 by means of rod 4, will cause lever 39 to have a counter-clockwise movement which will be sufficient to permit the inlet valve to become seated and prevent any more air under pressure from becoming effective in the power cylinder, thus stopping the movement of the piston thereof. When it is desired to exhaust the power cylinder and permit arm 5 and the cross shaft to return to their inoperative positions, the pedal 1 is released. The spring 38 will now be effective to move rod 34 relative to the casing and to the position indicated in Figure 2 and the lower end of lever 39 will move the exhaust valve element 31 off its seat. The fluid under pressure in the power cylinder will now be free to pass through the exhaust passage 29 and out through the outlet opening 47 to the atmosphere.

If at any time there should be power failure as a result of inadequate fluid under pressure in the pressure source, arm 5 may be manually actuated by pedal 1. After rod 34 has compressed spring 38 by moving a predetermined distance relative to casing 13, the shoulder 48 on the rod will engage shoulder 37 on the casing, thus transmitting force directly to rod 4 and arm 5.

By providing lever 39 between rod 34 and piston 25, the leverage ratio is so increased that it is possible to secure a proper reactive effect upon the pedal by means of piston 25. If a rigid arm were employed on rod 34 to control the valve elements, as has been prior practice, it would be impossible to obtain a proper reactive effect upon the pedal without employing a piston which would be considerably greater in diameter than the piston 25. It is thus seen that the use of lever 39 permits the use of the small piston 25 to secure the desired reactive effect, thereby decreasing the cost of the valve mechanism. The size of the valve mechanism is also decreased, thereby facilitating its association with the rods 2 and 4 and permitting it to be placed in a smaller space. It is also to be noted that the incorporation of the lever 39 in the valve mechanism permits the valve elements to be operated by a smaller pedal movement. Thus the valve can be controlled by a pedal which does not have as great a pedal travel as the pedals used to control prior valve mechanisms.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, the combination with a manual member and an actuated member operable by a fluid motor, of valve means associated with the manual member and the actuated member for controlling the flow of fluid to the motor and exhausting it therefrom, said valve means comprising a casing having separate and independent inlet and exhaust valves provided with spaced apart actuating portions, a lever pivoted at one end to the casing and having its other end positioned between the actuating portions of the valves for controlling said valves by movements in opposite directions relative to the casing, means for connecting the manual member to an intermediate part of the lever, means for connecting the casing to the actuated member, and a member subject to the fluid pressure effective on the movable element of the fluid motor and so associated with the end of the lever which is associated with the valves that a reactive force will be transmitted through the lever to the manual member.

2. In apparatus of the class described, the combination with a manual member and an actuated member operable by a fluid motor, of valve means associated with the manual member and the actuated member for controlling the flow of fluid to the motor and exhausting it therefrom, said valve means comprising a casing having inlet and exhaust valves, a lever pivoted at one end to the casing and having its other end associated with the valves for controlling same, means for connecting the manual member to an intermediate part of the lever, means for connecting the casing to the actuated member, and a movable member interposed between the said other end of the lever and the inlet valve and subject to the fluid pressure effective on the fluid motor for producing a reactive force on the manual member which force will be greater than the reactive force transmitted to the lever by said member.

3. In apparatus of the class described, the combination with a manual member and an actuated member operable by a fluid motor, of valve means associated with the manual member and the actuated member for controlling the flow of fluid to the motor and exhausting it therefrom, said valve means comprising a casing connected to the actuated member for movement therewith and having axially spaced apart inlet and exhaust valves, a lever pivoted at one end to the casing and having its other end positioned between the valves, a movable member interposed between the inlet valve and the lever and through which the valve is actuated by the lever, said member being subject to the fluid pressure effective on the movable element of the fluid motor for producing a reaction on the lever, and means for connecting the manual member to an intermediate part of the lever.

4. In apparatus of the class described, the combination with a manual member and an actuated member operable by a fluid motor, of valve means associated with the manual member and the actuated member for controlling the flow of fluid to the motor and exhausting it therefrom, said valve means comprising a casing having axially spaced apart inlet and exhaust valve elements, a lever pivoted at one end to the casing and having its other end positioned between the valve elements, a movable member interposed between the inlet valve and the lever and through which the valve is actuated by the lever, said member being subject to the fluid pressure effective on the movable element of the fluid motor for producing a reaction on the lever, means for connecting the manual member to an intermediate part of the lever, and spring means for normally biasing the lever to a position where the exhaust valve element is open and the inlet valve element is permitted to be held closed.

5. In apparatus of the class described, the combination with a manual member and an actuated member operable by a fluid motor, of valve means associated with the manual member and the actuated member for controlling the flow of fluid to the motor and exhausting it therefrom, said valve means comprising a casing having axially spaced apart inlet and exhaust valve elements, a lever pivoted at one end to the casing and having its other end positioned between the valve elements, a movable member interposed between the inlet valve and the lever and through which the valve is actuated by the lever, said member being subject to the fluid pressure effective on the movable element of the fluid motor for producing a reaction on the lever, means for connecting the manual member to an intermediate part of the lever, and adjustable means between the movable member and the lever.

6. In apparatus of the class described, a manually operated member, an actuated member, a fluid motor for actuating said actuated member, a source of fluid pressure, a valve mechanism for controlling the flow of fluid to the power cylinder and exhausting it therefrom, said valve mechanism comprising a casing provided with an inlet port and an exhaust port, valve elements for controlling said ports, a reaction member associated with the inlet valve and subject to the pressure admitted to the power cylinder, a lever pivoted to the valve casing and adapted to control the exhaust valve element and the inlet valve element through said reaction member, a reciprocable member for connecting the lever to the manually operated member, means for connecting the valve casing to the actuated member, and means providing a lost motion connection between the reciprocable member and the valve casing.

7. In apparatus of the class described, a manually operated member, an actuated member, a fluid motor for actuating said actuated member, a source of fluid pressure, a valve mechanism for controlling the flow of fluid to the power cylinder and exhausting it therefrom, said valve mechanism comprising a casing provided with an inlet port and an exhaust port, valve elements for controlling said ports, a reaction member associated with the inlet valve and subject to the pressure admitted to the power cylinder, a lever pivoted to the valve casing and adapted to control the exhaust valve element and the inlet valve element through said reaction member, a reciprocable member for connecting the lever to the manually operated member, means for connecting the valve casing to the actuated member, means providing a lost motion connection between the reciprocable member and the valve casing, and a spring for normally biasing the reciprocable member to a position where the lever will be operated prior to taking up the lost motion, said spring also normally maintaining the lever in a position causing the exhaust valve element to be open and the inlet valve element to be closed.

BURNS DICK.